(12) United States Patent
Buesing et al.

(10) Patent No.: US 7,736,432 B2
(45) Date of Patent: Jun. 15, 2010

(54) READY-MIX CONCRETE USING RECYCLED CONCRETE AGGREGATE

(75) Inventors: Jason Buesing, Denver, CO (US); Ken Buesing, Denver, CO (US); Jim Lucero, Edgewater, CO (US)

(73) Assignee: Recrete Materials, Inc., Arvada, CO (US)

( * ) Notice: Subject to any disclaimer, the term of this patent is extended or adjusted under 35 U.S.C. 154(b) by 0 days.

(21) Appl. No.: 12/207,392

(22) Filed: Sep. 9, 2008

(65) Prior Publication Data
US 2009/0064903 A1 Mar. 12, 2009

Related U.S. Application Data

(60) Provisional application No. 60/971,800, filed on Sep. 12, 2007.

(51) Int. Cl.
*C04B 18/16* (2006.01)
(52) U.S. Cl. .................. 106/713; 106/737; 106/745
(58) Field of Classification Search ............ 106/713, 106/745, 737
See application file for complete search history.

(56) References Cited

U.S. PATENT DOCUMENTS

| 5,525,153 A | 6/1996 | Cosola |
| 5,725,655 A | 3/1998 | Catterton et al. |
| 6,231,663 B1 | 5/2001 | Catterton et al. |

OTHER PUBLICATIONS

JP 2005111675 A (Shimomura) (Apr. 28, 2005). abstract only.*
JP 2005111675 A (Shimomura) English machine translation (Apr. 28, 2005).*

* cited by examiner

*Primary Examiner*—Paul Marcantoni
(74) *Attorney, Agent, or Firm*—Holland & Hart LLP

(57) ABSTRACT

A ready-mix concrete and method for making the ready-mix concrete having mix proportions that include at least 70% course recycled aggregate and fly ash is provided. The ready-mix concrete including cement, air, water, sand and a remaining percent of virgin course recycled aggregate such that the coarse recycled aggregate combines to 100% of the required course aggregate.

19 Claims, 1 Drawing Sheet

READY-MIX CONCRETE USING RECYCLED CONCRETE AGGREGATE

CLAIM OF PRIORITY UNDER 35 U.S.C. §§119 AND 120

The present application claims priority to the U.S. provisional patent application Ser. No. 60/971,800, titled READY-MIX CONCRETE USING RECYCLED CONCRETE AGGREGATE, filed Sep. 12, 2007, the specification of which is incorporated herein as if set out in full.

REFERENCE TO CO-PENDING APPLICATIONS FOR PATENT

None.

BACKGROUND

1. Field

The technology of the present application relates to ready mix concrete, and more specifically to ready mix concrete using recycled concrete aggregates.

2. Background

Using concrete for construction of roads, buildings, tarmacs, and the like has existed for centuries. Concrete provides a strong and formable building material. Because it is strong and formable, use of concrete in construction of roads, building, tarmacs, and the list has existed for centuries. While concrete can be formed of many materials, today's concrete typically includes a cement (most typically Portland cement in the United States), an aggregate (typically gravel and sand), and water admixture. Additional chemicals may be added depending on various features, such as hydration time, plasticizers, pigments, bonding agents, and the like.

Concrete can be mixed on-site in many applications. However, more and more frequently, project sites use what is typically known as "ready-mix concrete." A manufacturing facility combines the cement, aggregate, and water admixture to the specifications of the job site and in accordance with American Society for Testing Materials ("ASTM") requirements, which include international standards. The ASTM requirements define composition requirements for the concrete as well as strength and other requirements.

As one can appreciate, the ease and versatility of concrete has lead to an abundance of older structures. These structures are in various states of decay and/or in need of repair. While it is possible to tear down these structures and replace them with newer structures, the result is an abundance of concrete debris and rubble.

Thus, against this background, it would be desirable to develop a concrete that reuses or recycles used concrete debris and rubble.

SUMMARY

Embodiments disclosed herein address the above stated needs by providing a method to make ready-mix concrete wherein at least 70% of the coarse aggregate is recycled. The method including the steps of loading raw material bins with material in mix proportions for a ready-mix concrete, the loaded raw material include at least coarse recycled aggregate. A mix proportion of raw materials is programmed in a controlling plant computer that weighs the raw materials necessary for the programmed mix proportion, the measured raw materials including a weight of coarse aggregate such that the weight of coarse aggregate comprises at least about 70% or more coarse recycled aggregate and the remaining weight comprises coarse virgin aggregate and a weight of cement and fly ash. Once weighed and measured, the raw materials are transferred to a batch mixer and mixed.

The technology of the present invention also provides mix proportions for ready-mix concrete such that at least 70% of the coarse aggregate comprises recycled aggregate. The mix comprising about 564 pounds of cement, about 141 pounds of fly ash, about 35.3 ounces of water reducing agent ("WRA"), about 1260 pounds of recycled 57 rock, about 420 pounds of virgin 57/67 rock, about 1260 pounds of sand, about 220 pounds of water, and air-entraining admixture ("AEA") wherein a ready-mix concrete is made having about 70% coarse recycled aggregate.

The technology of the present invention also provides mix proportions for ready-mix concrete such that at least 70% of the coarse aggregate comprises recycled aggregate. The mix comprising about 526 pounds of cement, about 132 pounds of fly ash, about 32.9 ounces of water reducing agent ("WRA"), about 1275 pounds of recycled 57 rock, about 425 pounds of virgin 57/67 rock, about 1275 pounds of sand, about 218 pounds of water, and air-entraining admixture ("AEA") wherein a ready-mix concrete is made having about 70% coarse recycled aggregate.

The technology of the present invention also provides mix proportions for ready-mix concrete such that at least 70% of the coarse aggregate comprises recycled aggregate. The mix comprising about 489 pounds of cement, about 122 pounds of fly ash, about 30.6 ounces of water reducing agent ("WRA"), about 1290 pounds of recycled 57 rock, about 430 pounds of virgin 57/67 rock, about 1290 pounds of sand, about 216 pounds of water, and air-entraining admixture ("AEA") wherein a ready-mix concrete is made having about 70% coarse recycled aggregate.

The technology of the present invention also provides mix proportions for ready-mix concrete such that at least 70% of the coarse aggregate comprises recycled aggregate. The mix comprising about 451 pounds of cement, about 113 pounds of fly ash, about 28.2 ounces of water reducing agent ("WRA"), about 1295 pounds of recycled 57 rock, about 435 pounds of virgin 57/67 rock, about 1300 pounds of sand, about 205 pounds of water, and air-entraining admixture ("AEA") wherein a ready-mix concrete is made having about 70% coarse recycled aggregate.

DETAILED DESCRIPTION

Figure 1:
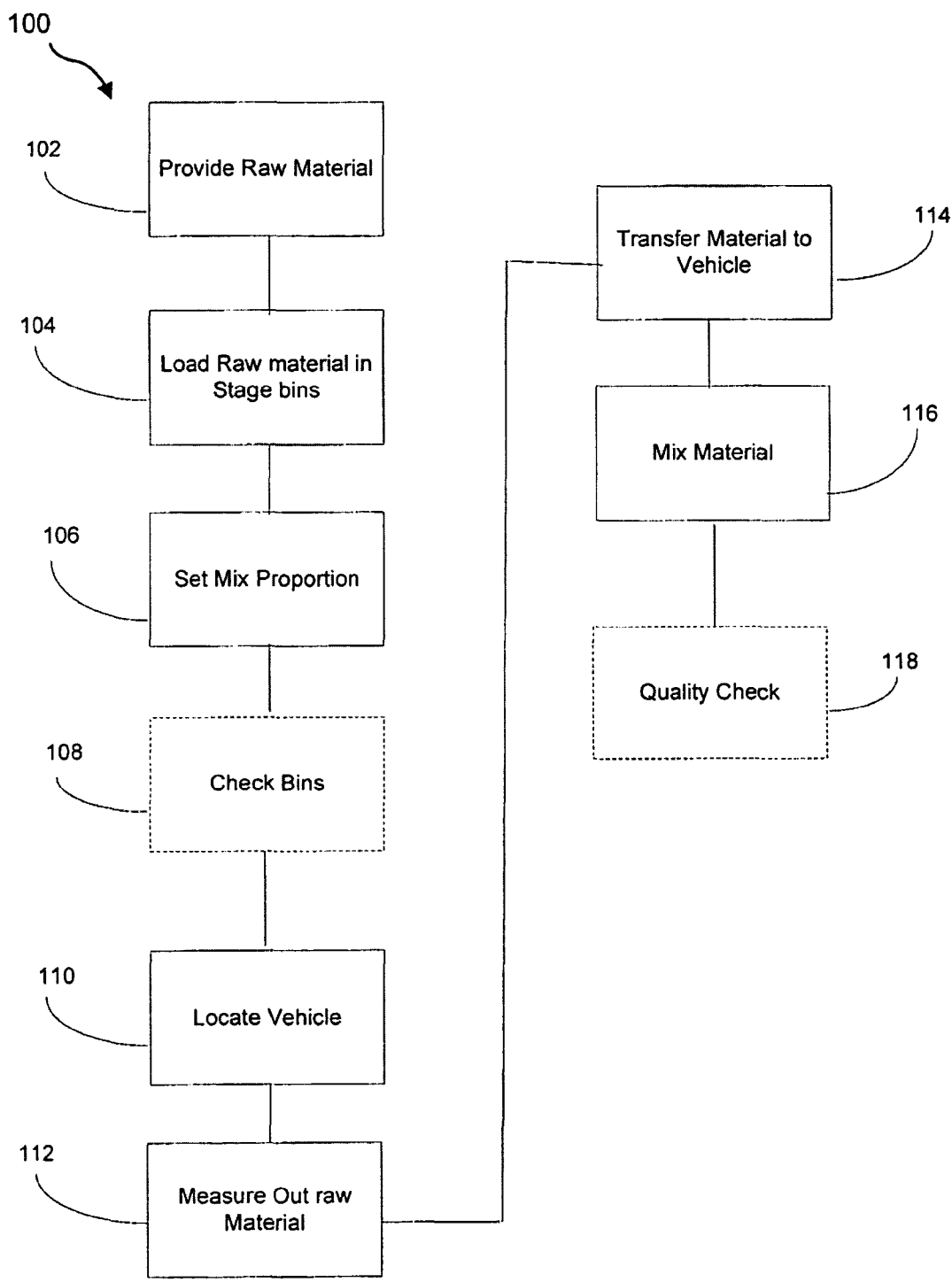
FIG. 1 is a flowchart illustrative of one embodiment relating to preparing ready-mix concrete using the technology of the present application.

The technology of the present application will now be explained. The technology will be explained with reference to particular composition, material, strength, and other requirements. As mentioned above, the reference is typically associated with an ASTM standard for a particular type of concrete. While a specific material may be called out, such as, for example, cement, mountain, type I/II L.A., at a particular poundage, such as, for example, 564 lbs, one of skill in the art would recognize that the particular composition called for is within a particular tolerance as defined by the ASTM standard. Thus, the present application may state the material as about 564 lbs of cement, mountain, type I/II L.A. wherein the term about, approximately, or similar term should be understood to mean within the tolerance as allowed by the existing ASTM standard as they currently exist and change from time to time. Moreover, the technology of the present invention will be explained with particular reference to exemplary embodiments and admixtures. The word "exemplary" is used herein to mean "serving as an example, instance, or illustration." Any embodiment described herein as "exemplary" is not necessarily to be construed as preferred or advantageous over other embodiments. Moreover, embodiments described herein should be construed as exemplary unless explicitly stated otherwise.

ASTM standard means any ASTM standard relating to concrete including ASTM C 94 relating to ready-mix concrete and ASTM C685 relating to concrete made by volumetric batching and continuous mixing to name but two of the numerous ASTM standards relevant to ready-mix concrete.

Generally speaking, concrete comprising, among other things, recycled material has been frowned upon in the industry because of many detrimental effects. Typically, using recycled material reduces, for example, the strength of the concrete. Additionally, the ready-mix concrete manufacturers have shunned using recycled material because of the abundance of virgin materials available to most ready-mix facilities.

Particularly shunned in the past was the recycling of aggregate material, i.e., sand and rock. It has been found, however, that in proper combinations recycling aggregate materials provides unexpected benefits to the ready-mix concrete. For example, using recycled sand not only reduces the need for virgin materials, which provides an environmental benefit, but also provides recycled cement that can be used for the gravel or rock portion of the aggregate. The recycled cement results from the crushing and screening operations to extract the recyclable sand.

Recycling concrete into the gravel or stone for ready-mix concrete also provides unexpected benefit to the ready-mix concrete. Generally, recycled concrete that has been crushed, screened and filtered to the appropriate size generally provides a lighter mixture per volume than non-recycled gravel or stone. Also, crushed concrete typically is a fractured face material that typically increases the strength of concrete using a similar recipe. Reducing the weight and increasing the strength allows for the carrying of a larger payload and allows less material for a similar cubic volume, which reduces overall resources.

While both recycled sand and recycled gravel or stone provide increased benefits, it has been found that particular combinations of materials work well. In one particular embodiment, it has been found combining about 30% recycled gravel or stone with 70% virgin stone provides a satisfactory admixture. Some sample embodiments suing this combination include the following ready-mix concretes:

Example 1 is a 30% coarse recycled aggregate ready-mix concrete comprising, in combination:

| Mix Proportions | Per 1.01 Cubic Yard | Per 1.01 Cubic Meter |
|---|---|---|
| CEMENT, Mountain, Type I/II Low Alkali ("LA") | 565 lbs | 335 kg |
| AEA, Eucon Air 40 | As needed | As needed |
| WRA, EUCON x15, 7 ozs/cwt | 39.6 ozs | 1531 mL |
| Coarse AGG - Recycled (for example, No. 57 Rock obtained from crushed and screened concrete rubble) | 535 lbs | 317 kg |

-continued

| Mix Proportions | Per 1.01 Cubic Yard | Per 1.01 Cubic Meter |
|---|---|---|
| Coarse AGG - Virgin (for example Del Camino No 57/67 Rock) | 1230 lbs | 730 kg |
| Fine AGG, Sand (any combination of virgin or recycled) | 1335 lbs | 792 kgs |
| Water | 245 lbs (or 29.4 gals) | 145 kg (or 145 L) |

The above and below combinations (for both 30% coarse recycled aggregate and 70% coarse recycled aggregate) are based on pre-mix weights (which are allowed to be within a tolerance, such tolerance will be designated as about or approximately), in other words, the mix proportions are largely saturated, surface dry condition based weights and amounts. The mixtures for ready mix concrete identified above refer to specific types of rock designated generally as 57 Rock and 57/67 Rock which would be understood in the art to refer to specifications associated with particular standards, such as, for example, the Colorado Department of Transportation specifications. The air-entraining admixture ("AEA"), such as, for example, Eucon Air 40 commonly used in concrete to ensure durability in freeze-thaw conditions and is available from, for example, Euclid Chemical and as commonly understood in the art for both the 30% and 70% coarse recycled aggregate described above and below would be supplied consistent with conventional techniques for adding air to the mix and as it is well within the ordinary skill of the art for someone making ready-mix concrete, it will not be explained herein. The water reducing agent ("WRA"), such as, for example, Eucon x15 which is further defined by the appropriate ASTMs as a Type A & F mid-range water reducer and is available from, for example, Euclid Chemical and as commonly understood in the art for both the 30% and 70% coarse recycled aggregate described above and below would be supplied consistent with conventional techniques for adding air to the mix and as it is well within the ordinary skill of the art for someone making ready-mix concrete, it will not be explained herein.

Using the above ready-mix concrete, the final product will generally provide satisfactory results for ASTM testing standards. For example, one batch provided a unit weight of concrete under ASTM C 138 as 143.4 pcf. A yield under ASTM C 138 of 27.27 ft cubed. A slump under ASTM C 143 of 3¼ inches. An air content under ASTM C 231 of 5.4% and a water/cementitious ration of 0.43 at 74° F.

A second embodiment of 30% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 452 lbs | 268 kg |
| FLY ASH, Nebraska, Class C | 113 lbs | 67 kg |
| AEA, Eucon Air 40 | As needed | As needed |
| WRA, EUCON x15, 7 ozs/cwt | 39.6 ozs | 1531 mL |
| Coarse AGG - Recycled (for example, No. 57 Rock obtained from crushed and screened concrete rubble) | 516 lbs | 306 kg |
| Coarse AGG - Virgin (for example Del Camino No 57/67 Rock) | 1204 lbs | 714 kg |
| Fine AGG, Sand (any combination of virgin or recycled) | 1285 lbs | 762 kgs |

-continued

| Mix Proportions | Per 1.01 Cubic Yard | Per 1.01 Cubic Meter |
|---|---|---|
| Water | 250 lbs (or 30 gals) | 148 kg (or 148 L) |

A third embodiment of 30% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 414 lbs | 246 kg |
| FLY ASH, Nebraska, class C | 103 lbs | 61 kgs |
| AEA, Eucon Air 40 | As needed | As needed |
| WRA, EUCON x15, 7 ozs/cwt | 35.7 ozs | 1380 mL |
| Coarse AGG - Recycled (for example, No. 57 Rock obtained from crushed and screened concrete rubble) | 500 lbs | 297 kg |
| Coarse AGG - Virgin (for example Del Camino No 57/67 Rock) | 1100 lbs | 653 kg |
| Fine AGG, Sand (any combination of virgin or recycled) | 1370 lbs | 813 kgs |
| Water | 250 lbs (or 30 gals) | 148 kg (or 148 L) |

A fourth embodiment of 30% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 517 lbs | 307 kg |
| AEA, Eucon Air 40 | As needed | As needed |
| WRA, EUCON x15, 7 ozs/cwt | 35.7 ozs | 1380 mL |
| Coarse AGG - Recycled (for example, No. 57 Rock obtained from crushed and screened concrete rubble) | 500 lbs | 297 kg |
| Coarse AGG - Virgin (for example Del Camino No 57/67 Rock) | 1130 lbs | 670 kg |
| Fine AGG, Sand (any combination of virgin or recycled) | 1290 lbs | 765 kgs |
| Water | 242 lbs (or 29.1 gals) | 144 kg (or 144 L) |

A fifth embodiment of 30% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 564 lbs | 335 kgs |
| FLY ASH, Nebraska, Class C | 141 lbs | 84 kgs |
| AEA, Eucon Air 40 | As needed | As needed |
| WRA, EUCON x15, 7 ozs/cwt | 35.3 ozs | 1365 mL |
| Coarse AGG - Recycled (for example, No. 57 Rock obtained from crushed and screened concrete rubble) | 475 lbs | 282 kg |
| Coarse AGG - Virgin (for example Del Camino No 57/67 Rock) | 1105 lbs | 656 kg |
| Fine AGG, Sand (any combination of virgin or recycled) | 1200 lbs | 712 kgs |

-continued

| Mix Proportions | Per 1.01 Cubic Yard | Per 1.01 Cubic Meter |
|---|---|---|
| Water | 250 lbs (or 30 gals) | 148 kg (or 148 L) |

A sixth embodiment of 30% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 705 lbs | 418 kg |
| AEA, Eucon Air 40 | As needed | As needed |
| WRA, EUCON x15, 7 ozs/cwt | 35.3 ozs | 1365 mL |
| Coarse AGG - Recycled (for example, No. 57 Rock obtained from crushed and screened concrete rubble) | 475 lbs | 282 kg |
| Coarse AGG - Virgin (for example Del Camino No 57/67 Rock) | 1105 lbs | 656 kg |
| Fine AGG, Sand (any combination of virgin or recycled) | 1200 lbs | 712 kgs |
| Water | 250 lbs (or 30 gals) | 148 kg (or 148 L) |

While the above six embodiments are provided, one of ordinary skill in the art will recognize and understand other combinations resulting in other mix proportions are possible.

Another combination that has been discovered to work particularly well includes a combination of about 70% recycled gravel or stone with 30% virgin stone. Some particular admixtures include the following ready-mix concretes.

A first embodiment of a 70% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 564 lbs | 335 kgs |
| FLY ASH, Nebraska, Class C | 141 lbs | 84 kgs |
| AEA, Eucon Air 40 | As needed | As needed |
| WRA, EUCON x15, 7 ozs/cwt | 35.3 ozs | 1365 mL |
| Coarse AGG - Recycled (for example, No. 57 Rock obtained from crushed and screened concrete rubble) | 1260 lbs | 748 kgs |
| Coarse AGG - Virgin (for example Del Camino No 57/67 Rock) | 420 lbs | 249 kgs |
| Fine AGG, Sand (any combination of virgin or recycled) | 1260 lbs | 748 kg |
| Water | 220 lbs (26.4 gals) | 131 kgs (131 L) |

A second embodiment of a 70% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 526 lbs | 312 kgs |
| FLY ASH, Nebraska, Class C | 132 lbs | 78 kg |
| AEA, Eucon Air 40 | As needed | As needed |
| WRA, EUCON x15, 7 ozs/cwt | 32.9 ozs | 1272 mL |

-continued

| Mix Proportions | Per 1.01 Cubic Yard | Per 1.01 Cubic Meter |
|---|---|---|
| Coarse AGG - Recycled (for example, No. 57 Rock obtained from crushed and screened concrete rubble) | 1275 lbs | 756 kgs |
| Coarse AGG - Virgin (for example Del Camino No 57/67 Rock) | 425 lbs | 252 kgs |
| Fine AGG, Sand (any combination of virgin or recycled) | 1275 lbs | 756 kgs |
| Water | 218 lbs (26.2 gals) | 129 kgs (129 L) |

A third embodiment of a 70% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 489 lbs | 290 kgs |
| FLY ASH, Nebraska, Class C | 122 lbs | 72 kgs |
| AEA, Eucon Air 40 | As needed | As needed |
| WRA, EUCON x15, 7 ozs/cwt | 30.6 ozs | 1183 mL |
| Coarse AGG - Recycled (for example, No. 57 Rock obtained from crushed and screened concrete rubble) | 1290 lbs | 765 kgs |
| Coarse AGG - Virgin (for example Del Camino No 57/67 Rock) | 430 lbs | 255 kgs |
| Fine AGG, Sand (any combination of virgin or recycled) | 1290 lbs | 765 kgs |
| Water | 216 lbs (25.9 gals) | 128 kg (128 L) |

A fourth embodiment of a 70% coarse recycled aggregate ready-mix concrete includes, in combination:

| Mix Proportions | Per 1.01 Cubic Yard | Per 1.01 Cubic Meter |
|---|---|---|
| CEMENT, Mountain, Type I/II LA | 451 lbs | 268 kgs |
| FLY ASH, Nebraska, Class C | 113 lbs | 67 kgs |
| AEA, Eucon Air 40 | As needed | As needed |
| WRA, EUCON x15, 7 ozs/cwt | 28.2 ozs | 1090 mL |
| Coarse AGG - Recycled (for example, No. 57 Rock obtained from crushed and screened concrete rubble) | 1295 lbs | 768 kgs |
| Coarse AGG - Virgin (for example Del Camino No 57/67 Rock) | 435 lbs | 258 kgs |
| Fine AGG, Sand (any combination of virgin or recycled) | 1300 lbs | 771 kgs |
| Water | 205 lbs (24.6 gals) | 122 kgs (122 L) |

While the above ready-mix concretes were made using 100% virgin sands, it is believed any amount of recycled sand from 0% to 20% could be used in place of or in combination with virgin sand.

Referring now to FIG. 1, a flowchart 100 is provided illustrating one possible methodology for making a ready-mix concrete using recycled materials. First, at step 102, the raw materials for the particular concrete composition are provided to a manufacturing plant. The raw materials may include, in no particular order:

Virgin Sand;
Virgin 57/67 Rock;
Virgin Pea Gravel;
Recycled 56/67 Rock;
Recycled Washed Sand;
Cement Type I/II (preferably low alkali);
Fly Ash Type C;
Admixtures as a matter of design choice and end use; and
Water (preferably fresh and potable).

Next, the raw materials are loaded into storage bins, step 104. A mix proportion is set in a controlling plant computer, step 106. While described in relation to preparing a single mix of ready-mix concrete, one of ordinary skill in the art will recognize on reading the disclosure that a plant typically batch loads mix proportions into the controlling plant computer to run numerous mixes automatically. Optionally, once the mix proportions are set, the controlling plant computer may check the appropriate raw materials are loaded in the bins, step 108. A delivery vehicle, typically a truck, is located at the plant outlet to receive the ready-mix concrete once the batch is prepared, step 110. Next, the controlling plant computer operates bin valves or gates to cause each bin to unload material onto an associated scale until an appropriate amount of material is measured, step 112. Once measured, the raw material is transferred to the truck, step 114. The truck mixes the raw material, typically 120 revolutions of the truck holder, step 116. Optionally, after the revolutions, the batch of ready-mix concrete is checked for quality, step 118, and delivered to the appropriate site, step 118.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of making ready-mix concrete using with at least 70% coarse recycled aggregate, the method comprising the steps of:
   loading raw material bins with material in mix proportions for a ready-mix concrete, the loaded raw material including at least coarse recycled aggregate;
   programming a mix proportion of raw materials in a controlling plant computer;
   weighing the raw materials necessary for the programmed mix proportion, the measured raw materials including a weight of coarse aggregate such that the weight of coarse aggregate comprises at least about 70% or more coarse recycled aggregate and the remaining weight comprises coarse virgin aggregate and fly ash;
   transferring the raw materials to a batch mixer; and
   mixing the raw materials into ready-mix concrete.

2. The method of claim 1, further comprising the step of providing the raw materials to be loaded into raw material bins.

3. The method of claim 1, further comprising the step of checking that the raw material bins contain the raw materials associated with the programmed mix proportion of raw materials.

4. The method of claim 1, wherein the batch mixer comprises a truck.

5. The method of claim 4, wherein the step of mixing the raw materials comprises causing a bin on the truck to revolve.

6. The method of claim 5, wherein the step of mixing includes at least 120 revolutions of the bin on the truck.

7. The method of claim 6, further comprising the step of quality checking the batch of ready-mix concrete.

8. A ready-mix concrete made from a combination of materials comprising:
- about 564 pounds of cement;
- about 141 pounds of fly ash;
- about 35.3 ounces of water reducing agent ("WRA"),
- about 1260 pounds of recycled rock;
- about 420 pounds of virgin rock;
- about 1260 pounds of sand;
- about 220 pounds of water; and
- air-entraining admixture ("AEA") wherein a ready-mix concrete is made having at least about 70% coarse recycled aggregate.

9. The ready-mix concrete of claim 8, wherein the cement is type I/II low alkali and the fly ash is class C.

10. The ready-mix concrete of claim 9, wherein the virgin rock is rock and the recycled rock is 57 rock.

11. A ready-mix concrete made from a combination of materials comprising:
- about 526 pounds of cement;
- about 132 pounds of fly ash;
- about 32.9 ounces of water reducing agent ("WRA"),
- about 1275 pounds of recycled rock;
- about 425 pounds of virgin rock;
- about 1275 pounds of sand;
- about 218 pounds of water; and
- air-entraining admixture ("AEA") wherein a ready-mix concrete is made having at least about 70% coarse recycled aggregate.

12. The ready-mix concrete of claim 11, wherein the cement is type I/II low alkali and the fly ash is class C.

13. The ready-mix concrete of claim 12, wherein the virgin rock is 57/67 rock and the recycled rock is 57 rock.

14. A ready-mix concrete made from a combination of materials comprising:
- about 489 pounds of cement;
- about 122 pounds of fly ash;
- about 30.6 ounces of water reducing agent ("WRA"),
- about 1290 pounds of recycled rock;
- about 430 pounds of virgin rock;
- about 1290 pounds of sand;
- about 216 pounds of water; and
- air-entraining admixture ("AEA") wherein a ready-mix concrete is made having at least about 70% coarse recycled aggregate.

15. The ready-mix concrete of claim 14, wherein the cement is type I/II low alkali and the fly ash is class C.

16. The ready-mix concrete of claim 15, wherein the virgin rock is 57/67 rock and the recycled rock is 57 rock.

17. A ready-mix concrete made from a combination of materials comprising:
- about 451 pounds of cement;
- about 113 pounds of fly ash;
- about 28.2 ounces of water reducing agent ("WRA"),
- about 1295 pounds of recycled rock;
- about 435 pounds of virgin rock;
- about 1300 pounds of sand;
- about 205 pounds of water; and
- air-entraining admixture ("AEA") wherein a ready-mix concrete is made having at least about 70% coarse recycled aggregate.

18. The ready-mix concrete of claim 17, wherein the cement is type I/II low alkali and the fly ash is class C.

19. The ready-mix concrete of claim 18, wherein the virgin rock is 57/67 rock and the recycled rock is 57 rock.

* * * * *